United States Patent
Buehl

[15] 3,660,074
[45] May 2, 1972

[54] METHOD FOR TREATING TITANIUM SCRAP

[72] Inventor: Russell C. Buehl, Beaver, Pa.
[73] Assignee: Crucible Inc., Pittsburgh, Pa.
[22] Filed: May 7, 1969
[21] Appl. No.: 822,522

[52] U.S. Cl. .......................................... 75/10, 75/65, 75/84
[51] Int. Cl. .................. C22d 7/02, C22b 53/00, C22b 53/00
[58] Field of Search ..................... 75/10, 11, 63, 65, 53, 84, 75/68

[56] References Cited

UNITED STATES PATENTS

| | | | |
|---|---|---|---|
| 1,918,339 | 7/1933 | Keith | 75/68 |
| 2,541,764 | 2/1951 | Herres | 75/10 |
| 2,548,897 | 4/1951 | Kroll | 75/10 |
| 2,727,936 | 12/1955 | Boyer | 75/10 |
| 2,734,244 | 2/1956 | Herres | 75/10 |
| 2,789,152 | 4/1957 | Ham | 75/10 |
| 2,805,148 | 9/1957 | De Long | 75/65 |
| 3,005,246 | 10/1961 | Murphy | 75/10 |
| 3,417,808 | 12/1968 | Rosenberg | 75/65 |
| 3,249,425 | 5/1966 | Aamot | 75/68 R |
| 3,406,027 | 10/1968 | Bonilla | 75/53 |

*Primary Examiner*—Winston A. Douglas
*Assistant Examiner*—Peter D. Rosenberg
*Attorney*—Clair X. Mullen, Jr.

[57] ABSTRACT

This is a process for melting titanium scrap to provide a material free from dense inclusions. This is accomplished by melting a quantity of titanium scrap in a crucible, maintaining the same molten for a period sufficient to either melt dense inclusions or have them in unmelted form sink to the bottom of the melt, discontinuing heating to form a solidified skull adjacent to the bottom of the melt to entrap the inclusions and then removing the inclusion-free metal from the crucible.

11 Claims, 1 Drawing Figure

PATENTED MAY 2 1972
3,660,074
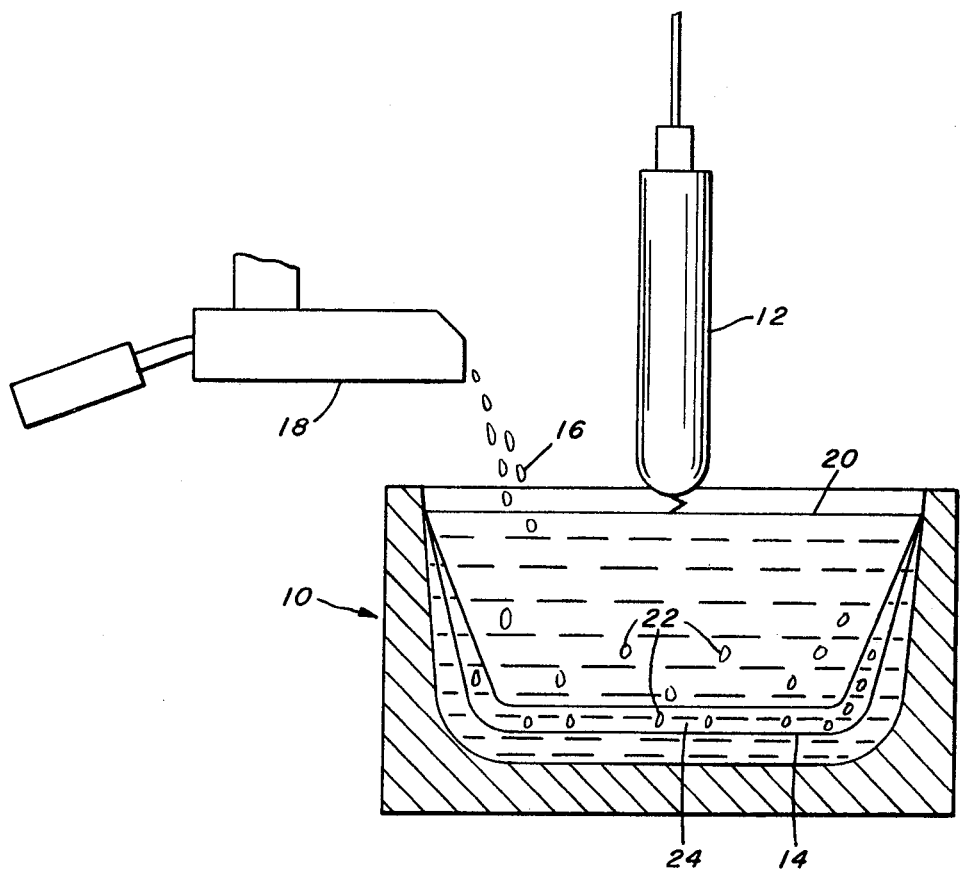
INVENTOR.
RUSSELL C. BUEHL
By Clair X. Mullen Jr.
Attorney

METHOD FOR TREATING TITANIUM SCRAP

There is presently an excess of titanium-alloy scrap, particularly what is termed light scrap, which are chips and turnings. Titanium scrap, particularly of this character, is not readily reused, at least to the extent available, in the manufacture of titanium. This is due principally to the fact that scrap containing dense, high-melting point metals and their carbides, such as tungsten, molybdenum, and columbium, cannot be removed from the scrap and tend, therefore, to contaminate melts made therefrom.

It is, therefore, the primary object of this invention to provide a process whereby titanium-alloy scrap may be rendered useful for further melting, while avoiding the prior-art disadvantages, as described above, with regard to the use of such scrap.

This and other objects of the invention, as well as a complete understanding thereof, may be obtained from the following description and drawing, in which the single Figure thereof is a schematic showing of apparatus suitable for the practice of the invention.

Scrap intended for use by remelting with virgin alloy as titanium sponge is first subjected to a conventional degreasing operation and removal of dirt and other surface contaminates. It is then comminuted to provide a substantially uniform size consist. Thereafter, magnetic material is removed, as by conventional high intensity magnetic separation.

The material so prepared is then introduced to a crucible for melting. Prior to this step, however, the bottom of the crucible is provided with a layer of scrap material, which preferably is either titanium scrap or titanium sponge. This material is melted to form a pool having a periphery spaced a distance, usually about 1 inch, from the mold or crucible interior. This step in the process serves to protect the bottom of the crucible and also serves to provide molten material adjacent to the crucible bottom prior to scrap introduction to the crucible, which accelerates the rate of melting of the scrap material in the lower portion of the crucible. Any conventional heating means that is sufficient to melt the scrap and provide a proper depth of molten metal within the crucible may be used. This may, for example, include an electron-beam gun or a nonconsumable electrode, wherein melting is achieved by the use of an arc between the electrode tip and the material in the crucible. The use of a nonconsumable electrode is preferred, because it more readily provides a deeper pool of molten metal, which for the reasons discussed hereinafter is preferred for the purposes of the invention.

Upon formation of the molten pool in the crucible bottom, as described above, titanium scrap is fed to the pool and is rapidly heated to a temperature considerably above its melting point, which may typically be a temperature of about 4,000° F. The use of high-temperature melting facilitates rapid dissolving of the high-melting point dense inclusions present within the scrap. After the charge has been melted, and the crucible is thus filled with molten scrap, heating thereof is continued in the absence of further scrap addition. In this manner, the dense inclusions remaining in the melt are subjected to additional heating to permit them to dissolve and those which do not dissolve are given sufficient time to sink to the bottom of the crucible and thus deposit along the liquid-solid interface. Usually, this interface, or the zone adjacent to the molten metal pool initially formed prior to scrap heating, will be in a "mushy" or semi-solid state. Heating is then discontinued, or substantially reduced, and a period is allowed to elapse sufficient to permit complete solidification of this semi-solid material. This causes the unmelted dense inclusions, which have settled into this material, to be entrapped therein. The remaining molten metal may be then poured from the crucible into suitable molds of a character depending upon the intended further use of the metal. For example, the metal may be cast into molds to form, in conjunction with titanium sponge or virgin titanium, consumable electrodes for arc-melting.

Although the conditions of the process as described above will vary depending upon specific apparatus used, generally the depth of the scrap layer provided in the crucible prior to titanium scrap addition and melting is on the order of 4 to 6 inches, with the distance of the molten pool periphery being about 1 inch from the crucible interior. To provide the desired molten metal pool depth, which is necessary to permit efficient separation by sinking and entrapment of the unmelted dense inclusions, it is preferred to use a nonconsumable electrode for the melting operation because of the inherent deeper bath penetration of the arc. In addition, for this purpose, it may be advantageous to use titanium sponge as a replacement for at least a portion of the scrap used to line the crucible bottom as this material will provide a more efficient heat barrier and thus reduce the heat loss through the crucible walls. Also, it is advantageous to reduce heat loss by radiation from the surface of the molten metal in the crucible. For this purpose heat shields may be used or the electrode used for scrap melting may be of a dimension as to substantially cover the molten metal bath surface; alternately, the electrode tip may be specially shaped so as to concentrate heat toward the molten pool and away from the periphery. These expedients, which depending upon the application may be used either singly or in combination, contribute to minimizing heat loss from the bath and consequently promote increased depth of the molten metal pool. With respect to the time required upon discontinuance of heating and prior to removing the molten metal from the crucible, which operation is provided for the purpose of permitting unmelted inclusions to be entrapped adjacent to the pool bottom, this time will vary depending upon the conditions of a particular operation, such as crucible size, pool depth and the rate of heat transfer from the bath of molten metal. Broadly, however, times on the order of 15 seconds to 2 minutes are typically required.

For a specific example of the practice of the invention reference should be had to the single FIGURE of the drawing showing a crucible, designated generally as 10 which is positioned within an evacuated chamber, not shown. As described above, scrap is introduced to the crucible 10 and melted, as by consumable electrode 12 to form a skull 14 within the crucible. Thereafter additional titanium scrap 16 is introduced to the crucible, as by conventional vibrating feeder 18 for melting. This material melted within the crucible forms a molten pool 20. When the crucible has been filled to capacity with molten scrap, further additions are discontinued and heating by use of the nonconsumable electrode 12 is continued for a period sufficient to either melt dense inclusions, which are indicated by the numeral 22 in the FIGURE, or alternately permit them to sink into the semi-solid zone 24 that forms along the skull 14. Heating is then discontinued and the unmelted dense inclusions 22 are caused to be trapped within this semi-solid layer 24 as it solidifies in the absence of further heating. The metal 20 may then be removed from the crucible free from unmelted dense inclusions.

Upon removal of the molten metal the entrapped inclusions may then be removed from the crucible to ready it for subsequent operation by simply applying additional heat to the material comprising the layer 24 to render the same molten and then removing it from the crucible while it is in the molten state.

It is to be understood, of course, that because of the highly reactive nature of titanium, the operation as described above is conducted in a nonoxidizing atmosphere, usually a vacuum.

It is to be understood that the term titanium scrap as used herein includes scrap comprised of any titanium-base alloy.

Although one embodiment of the invention has been shown and described herein, it is obvious that other adaptations and modifications may be made without departing from the scope and spirit of the appended claims.

I claim:

1. A method for melting titanium scrap in a nonoxidizing atmosphere to remove dense inclusions comprising introducing a quantity of scrap to a mold, melting said scrap to form a molten pool thereof, said pool having a periphery spaced a distance from the mold interior, feeding titanium to said mold, applying heat to melt the same to form an increasing pool of liquid metal within said mold, discontinuing said feeding while continuing application of heat to said pool to maintain the same liquid and permitting unmelted dense inclusions to sink to said periphery, discontinuing said heat for a period of time sufficient to form a solidified metal layer adjacent said periphery and trap said inclusions therein, and pouring liquid metal from said mold.

2. The method of claim 1 wherein heat is applied continuously during feeding of said scrap to said mold.

3. The method of claim 1 wherein at least a portion of the scrap initially introduced to the mold to initially form the molten pool is replaced with titanium sponge, whereby heat transfer through the mold walls is reduced.

4. The method of claim 1 wherein means are used for reducing heat loss from the molten pool surface during melting.

5. The method of claim 1 wherein said heating and melting is achieved by the use of a nonconsumable electrode.

6. The method of claim 1 wherein said initial scrap is introduced to the mold in an amount to provide a layer of about 4 to 6 inches thick and upon melting the periphery of the molten pool is spaced about 1 inch from the mold interior.

7. The method of claim 1 wherein said scrap is cleaned of surface contaminants and comminuted to a substantially uniform size consist prior to introduction to said mold.

8. The method of claim 1 wherein magnetic material is removed from said scrap prior to introduction to said mold.

9. A method for melting titanium scrap in a nonoxidizing atmosphere to remove dense inclusions comprising preparing said scrap for melting by crushing a quantity of scrap to pieces of substantially uniform size, cleaning said scrap to remove surface contaminants and removing magnetic material from said scrap, introducing a quantity of said scrap to a mold to a depth of about 4 to 6 inches, arc melting said scrap by the use of a nonconsumable electrode to form a molten pool thereof having a periphery spaced a distance from the mold interior, feeding additional titanium scrap to said mold while continuing said arc melting to form an increasing pool of liquid metal within said mold, discontinuing said feeding of scrap to the mold while continuing said arc melting to maintain said pool liquid and permitting unmelted dense inclusions to sink to said periphery, discontinuing said arc melting for a period of time sufficient to form a solidified metal layer adjacent said periphery and trap said inclusions therein and withdrawing liquid metal from said mold.

10. The method of claim 9 wherein at least a portion of the titanium scrap initially introduced to the mold to initially form the molten pool is replaced with titanium sponge, whereby heat transfer through the mold walls is reduced.

11. The method of claim 10 wherein means are used to reduce heat loss from the molten pool surface during melting.

* * * * *